(12) United States Patent
Chai

(10) Patent No.: US 9,957,956 B1
(45) Date of Patent: May 1, 2018

(54) SYSTEMS AND METHODS FOR CANISTER FLUID FILTERS

(71) Applicant: David Chai, Brea, CA (US)

(72) Inventor: David Chai, Brea, CA (US)

( * ) Notice: Subject to any disclaimer, the term of this patent is extended or adjusted under 35 U.S.C. 154(b) by 0 days. days.

(21) Appl. No.: 15/217,938

(22) Filed: Jul. 22, 2016

Related U.S. Application Data

(60) Provisional application No. 62/198,076, filed on Jul. 28, 2015.

(51) Int. Cl.
| | |
|---|---|
| A01K 63/04 | (2006.01) |
| F04B 9/14 | (2006.01) |
| B01D 36/00 | (2006.01) |
| F04B 19/22 | (2006.01) |
| F04B 19/04 | (2006.01) |

(52) U.S. Cl.
CPC .............. *F04B 9/14* (2013.01); *A01K 63/045* (2013.01); *B01D 36/001* (2013.01); *F04B 19/04* (2013.01); *F04B 19/22* (2013.01)

(58) Field of Classification Search
CPC . F04B 9/14; F04B 19/22; F04B 19/04; A01K 63/045
USPC ......... 210/167.25, 167.21, 188, 416.1, 416.2
See application file for complete search history.

(56) References Cited

U.S. PATENT DOCUMENTS

| | | | | |
|---|---|---|---|---|
| 3,389,801 A | * | 6/1968 | Sieger | F02M 37/14 137/565.3 |
| 5,154,821 A | * | 10/1992 | Reid | B01D 35/26 210/167.1 |
| 5,549,816 A | * | 8/1996 | Harp | B01D 33/0183 210/120 |
| 5,868,931 A | * | 2/1999 | Janik | B01D 35/26 210/117 |
| 2013/0327700 A1 | * | 12/2013 | Ellis | B01L 3/502 210/416.1 |

* cited by examiner

*Primary Examiner* — Fred Prince
(74) *Attorney, Agent, or Firm* — Lilaw Inc.

(57) ABSTRACT

The present invention covers systems and methods for priming a canister fluid filtration system. It utilizes the push and pull caused by the movement of a piston of a priming pump between two openings in the chamber of the priming pump, to push the air out of the canister and introduces fluid into it, thereby achieving the purpose of priming the fluid filtration system.

11 Claims, 3 Drawing Sheets

SYSTEMS AND METHODS FOR CANISTER FLUID FILTERS

CROSS-REFERENCE TO RELATED APPLICATIONS

Pursuant to 35 U.S.C. 119 (e), this utility patent application claims priority to U.S. Provisional Patent Application No. 62/198,076, filed on Jul. 28, 2015.

STATEMENT REGARDING FEDERALLY SPONSORED RESEARCH OR DEVELOPMENT

Not Applicable

NAME OF THE PARTIES TO A JOINT RESEARCH AGREEMENT

Not Applicable

REFERENCE TO A "SEQUENCE LIST", A TABLE, OR A COMPUTER PROGRAM LISTING APPENDIX SUBMITTED ON A COMPUTER DISC (CD) AND AN INCORPORATION-BY-REFERENCE OF THE MATERIAL ON THE COMPUTER DISC

Not Applicable

STATEMENT REGARDING PRIOR DISCLOSURE BY AN INVENTOR OR JOINED INVENTOR

Not Applicable

BACKGROUND OF THE INVENTION

The invention described in the patent application is related to canister fluid filters commonly used in aquariums and other fluid systems where fluids are circulated through a device for cleaning or conditioning.

For example, in an aquarium system, a canister filter purifies the aquarium water by pushing the water through a pressurized tank located outside the aquarium tank. The filter draws the water out of the tank through an intake tube with sieves and valves, and into the sealed canister where the water is pushed through a series of filter media to clean the aquarium water. The filtered water is then pumped back into the aquarium tank via spray bar or other devices to minimize water flow.

Many types of filtrations can be accomplished with a canister filter, including chemical, biological, and mechanical filtration. The direction of water flow also varies between models and brands of canister filters. It can be, for example, top-to-bottom or back-to-front, depending on the particular designs of the canister filters.

The canister filter can also be used in other types of fluid cleaning or conditioning systems.

Before use, a canister filter must be properly "primed" to push all the air out of the system to allow a free flow of the fluid. The prior art canister filters utilize a priming pump that pushes the air out by opening the valve, as shown in FIG. 1. As it invariably requires multiple pumping actions to push all the air out, the prior art priming process is slow and time consuming. The present invention overcomes the prior art's shortcomings.

BRIEF SUMMARY OF THE INVENTION

The present invention presents a new type of priming pump for canister filters. The new pump uses a cylinder-like device to force all the air out of the system in one easy motion, as shown in FIG. 2. This allows for faster and easier priming of the canister filters. In one embodiment of the pump, the priming of the canister filter can be achieved with a single pull-and-push motion, through a piston-like structure. An embodiment of the piston-like structure calls for a chamber inside the pump canister, a piston that can be moved through the chamber by a handle that is accessible outside the canister, a first opening on the first end of the chamber which has a fluid connection to the fluid to be filtered, a second opening on the second end of the chamber which has a fluid connection to the inside of the canister. In such an embodiment, the filtration system is primed by first moving the piston toward the first opening and then moving it back, so that the air bubbles in the canister are pushed out and the fluid enters the canister to allow the filtration pump to work properly.

In another embodiment, the priming system is used to prime a fluid pump instead of a fluid filtration system.

In yet another embodiment, the priming process can be automated so that the priming can be achieved by pressing a button.

DETAILED DESCRIPTION OF THE INVENTION

Figure 1:
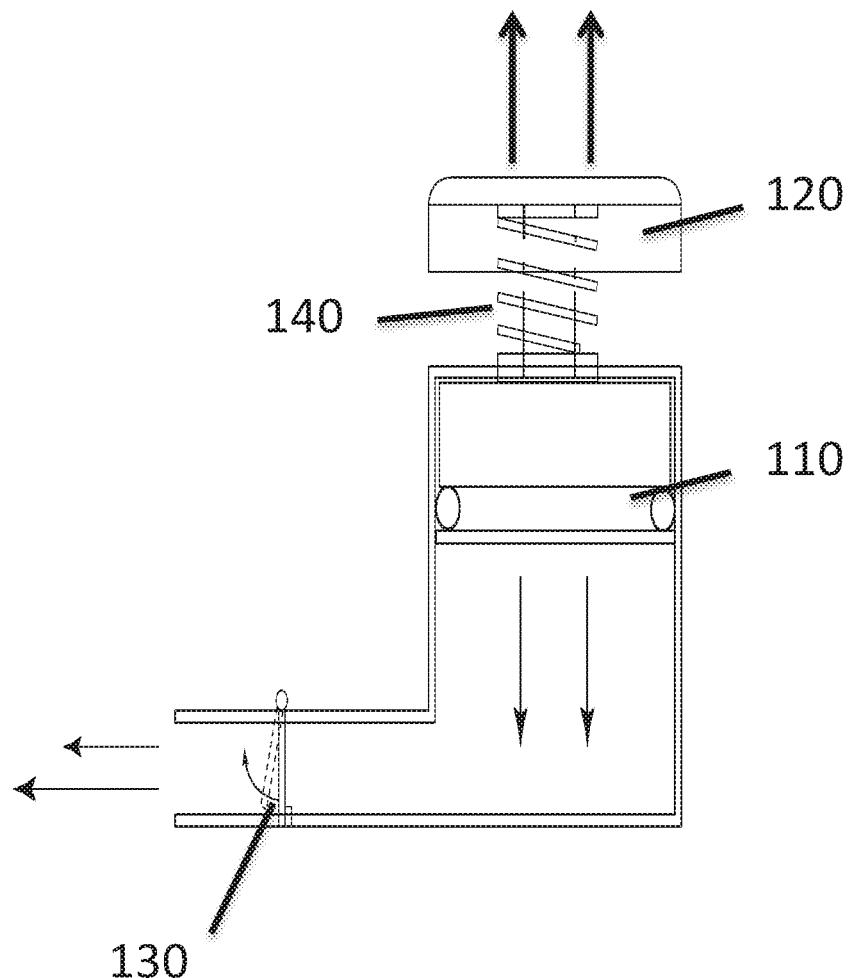
FIG. 1 illustrates the working mechanism of a prior art priming pump.

As shown in FIG. 1, the prior art priming pump in general contains a piston 110 which can be pushed downward through a press button 120. The downward movement of the piston drives some air out of the chamber by opening the one-way valve 130. Upon removing the pressure from the button 120, the spring 140 pushes the piston upward. When the same motion is repeated a few times, sufficient amount of air is pushed out the system and the pump is primed.

Figure 2:
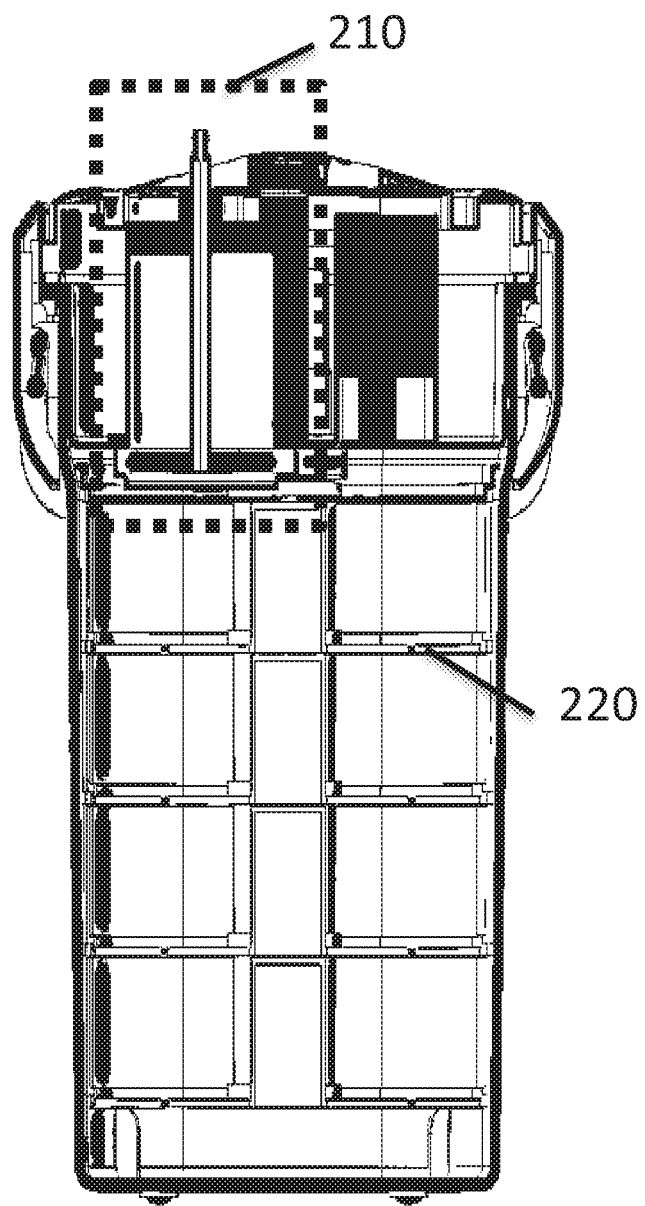
FIG. 2 is a cross-section depiction of an actual canister filtration system with the priming pump marked by the dotted rectangular.

FIG. 2 is an embodiment of the present invention. It is a cross-section view of a water filtration canister pump. The canister contains various filters 220. The prime pump 210 embodying the present invention is situated on the top left side of the canister, consisting of primarily a cylinder and a piston.

Figure 3:
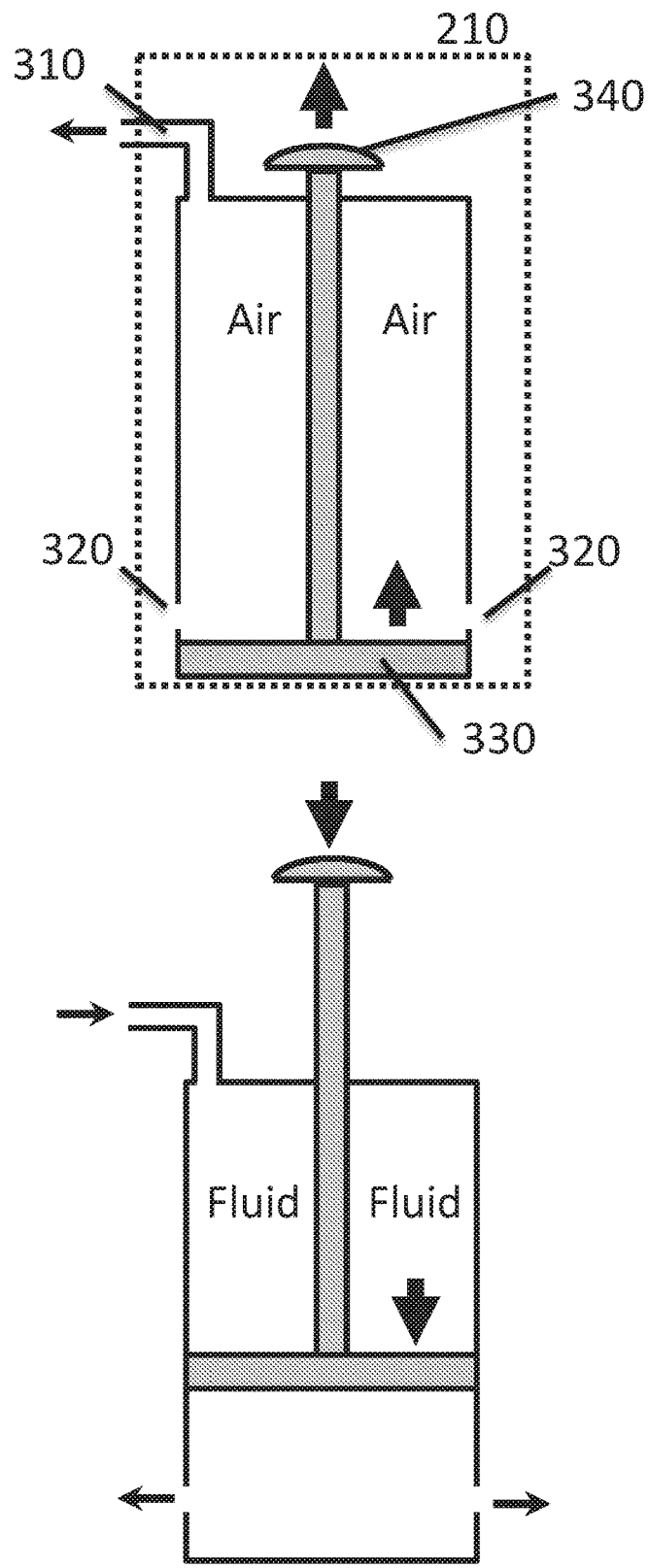
FIG. 3 is a schematic illustration of an embodiment of the present invention.

FIG. 3 is a schematic illustration of how the prime pump 210 works. The outlet 310 has a fluid connection with fluid that needs to be pumped or filtered. A "fluid connection" in the patent means a connection of two points with tubing or equivalents to allow fluid or air to flow between the two points. For example, a common use of the priming mechanism is in a water filtration pump for an aquarium where the outlet 310 is connected by tubing to the aquarium water. The openings 320 are the openings of the priming pump chamber to the inside of the canister of the filtration system. As any functional cylinder and piston, they have to be perfectly fit to each other to be air tight when the piston moves up and down the cylinder.

On the top half of FIG. 3, the priming pump is in its starting or resting state where the chamber or cylinder of the priming pump is filled with air. To prime the canister pump, the user pulls up the handle 340, which causes the piston 330 to move up the cylinder. This upward movement of the piston 330 pushes the air out the priming pump cylinder to the aquarium tank. After the piston 330 reaches the top of the chamber, the user pushes the handle 340 down, which sucks the water from the tank into the cylinder and pushes the air out of the canister (bottom half of the figure). As the piston 330 continues downward to pass the opening 320 located near the piston's resting position, the water enters the canister from the priming pump chamber through the opening 320. Then the canister is primed and ready to work. This priming process only requires one operation: moving the priming handle 340 up and down. Without the prior art's valves and spring, the priming pump of the present invention is easier and cheaper to manufacture. The invention thus offers significant advantages over the prior art.

The above description is merely one form of embodiment of the present invention. There can be many variations in the specific implementation. For example without limitation, the priming pump chamber is preferably a cylinder, but can be in any geometric shape as long as it can work properly with the piston. The opening 320 may be designed as a single or multiple outlets. The piston 330 and the associated handle 340 can have many different designs well known in the art of mechanical engineering. The priming pump may be located anywhere inside the canister in any orientation, or even as a separate component that is connected to the canister via tubing. The canister may be of any size, despite its traditional meaning of being a small container. The priming pump may be motorized in a way that allows the priming to be accomplished by pressing a button or flipping a switch. The movement of the priming piston can be automated through, for example, an electromagnetic mechanism, which is within the knowledge of a person of reasonable skill in the art. In such automated system, the priming can be achieved by one push of the button. For convenience, the phase "one push of the button" is defined hereby to mean any electric switch.

Other than for priming aquarium filtration pump as described above, the priming mechanism can be used with any canister fluid pumps such as swimming pool filtration pump and oil pump.

The embodiments described above may be implemented by common manufacturing techniques which are within the knowledge of a person of ordinary skill in the art.

I claim:

1. A system for priming an aquarium canister fluid filtration system, comprising:
   a. A chamber;
   b. A piston that can be moved through the chamber by a handle that is accessible outside said aquarium canister fluid filtration system and said chamber;
   c. A first opening on first end of the chamber which has a fluid connection to the fluid to be filtered;
   d. A second opening on the second end of the chamber which has a fluid connection to the inside of said aquarium canister fluid filtration system and is positioned on the chamber such that it is above the piston when the piston is fully depressed and may be below the piston when the piston is less than fully depressed;
   Wherein the filtration system is primed by first moving the piston toward the first opening and then moving it back, so that any air bubbles in said aquarium canister fluid filtration system are pushed out and the fluid enters the canister to allow said aquarium canister fluid filtration system to work properly.

2. The system for priming an aquarium canister fluid filtration system of claim 1, wherein the second opening comprises one or more holes or slots on the wall of said chamber that open to the inside of said aquarium canister fluid filtration system.

3. The system for priming an aquarium canister fluid filtration system of claim 1, wherein the movement of the piston is automated to allow the priming to be achieved by one push of a button.

4. An aquarium canister fluid filtration system, comprising
   a. A canister containing one or more filters;
   b. A pump for pumping the fluid in and out of the canister to filter the fluid;
   c. A system for priming an aquarium canister fluid filtration system of claim 1.

5. The canister fluid filtration system of claim 4, wherein the second opening of the system for priming an aquarium canister fluid filtration system comprises one or more holes or slots on the wall of the chamber that open to the inside of the aquarium canister fluid filtration system.

6. The aquarium canister fluid filtration system of claim 4, wherein the movement of the piston is automated to allow the priming to be achieved by one push of a button.

7. A method of priming an aquarium canister fluid filtration system using a system for priming an aquarium canister fluid filtration system of claim 1, comprising
   a. Making a fluid connection between a first opening of the system for priming an aquarium canister fluid filtration system and the fluid to be filtered,
   b. Moving the piston from its resting position along a chamber of the system for priming an aquarium canister fluid filtration system to push out any air in system for priming an aquarium canister fluid filtration system to the fluid through the first opening;
   c. Moving the piston back to its resting state so that the fluid is sucked via the first opening into the chamber by the movement of the piston, whereas the second opening near the resting position of the piston allows the fluid to flow into the aquarium canister fluid filtration system from the chamber.

8. The method of claim 7, wherein the second opening of the system for priming an aquarium canister fluid filtration system comprises one or more holes or slots on the wall of the chamber that open to the inside of the aquarium canister fluid filtration system.

9. The method of claim 7, wherein the movement of the piston is automated to allow the priming to be achieved by one push of a button.

10. A priming system for a fluid pump, comprising:
    a. A priming chamber;
    b. A piston that can be moved through the priming chamber by a handle that is accessible from the outside of the fluid pump and priming system for a fluid pump;
    c. A first opening on first end of the chamber which has a fluid connection through an inlet of the fluid pump to the fluid to be pumped;
    d. A second opening on the second end of the chamber which has a fluid connection to an outlet of the fluid pump and is positioned on the chamber such that it is above the piston when the piston is fully depressed and can be below the piston when the piston is less than fully depressed;
    e. Wherein the fluid pump is primed by first moving the piston toward the first opening and then moving it back, so that any air bubbles in the fluid pump are pushed out and replaced by fluid to allow the fluid pump to work properly.

11. A method for priming a fluid pump, comprising:
a. Providing a priming system for a fluid pump of claim 10;
b. Making a fluid connection between the first opening of the priming chamber and a fluid to be filtered,
c. Moving the piston from its resting position along the priming chamber to push out any air in the fluid pump to the fluid through the first opening;
d. Moving the piston back to its resting state so that the fluid is sucked via the first opening into the priming chamber by the movement of the piston, whereas the second opening near the resting position of the piston allows the fluid to push any air out of the fluid pump and fill the fluid pump with the fluid.

\* \* \* \* \*